United States Patent [19]
Gulbis et al.

[11] 3,925,675
[45] Dec. 9, 1975

[54] PORTABLE FLUOROSCOPE

[75] Inventors: Imants Gulbis, Reston, Va.; Rodney W. Jordan, Newton, N.J.

[73] Assignee: The United States of America as represented by the Secretary of the Army, Washington, D.C.

[22] Filed: Sept. 6, 1974

[21] Appl. No.: 504,000

[52] U.S. Cl. .............................................. 250/485
[51] Int. Cl.² ........................................ G01N 21/52
[58] Field of Search ............ 250/361, 363, 366, 485

[56] References Cited
UNITED STATES PATENTS

| | | | |
|---|---|---|---|
| 2,290,767 | 7/1942 | Reuter ................................. | 250/485 |
| 2,537,373 | 1/1951 | Rosenberg .......................... | 250/485 |

Primary Examiner—Archie R. Borchelt
Attorney, Agent, or Firm—Nathan Edelberg; Robert P. Gibson; Max Yarmovsky

[57] ABSTRACT

A portable fluoroscope utilizes a hingedly mounted, light shielded, fluorescent screen positioned in front of a look-through radiation shield. A leaded glass eyepiece positioned within the radiation shield is used as a radiation resistant viewing port to observe the image produced on the fluorescent screen by an irradiated object. The use of a relatively small piece of lead-glass in the viewing port of the present device in comparison to the use of a lead-glass plate the size of the fluorescent screen, which is immediately adjacent thereto in the prior art, has resulted in a substantial reduction in weight and cost for the same degree of radiation protection.

1 Claim, 3 Drawing Figures

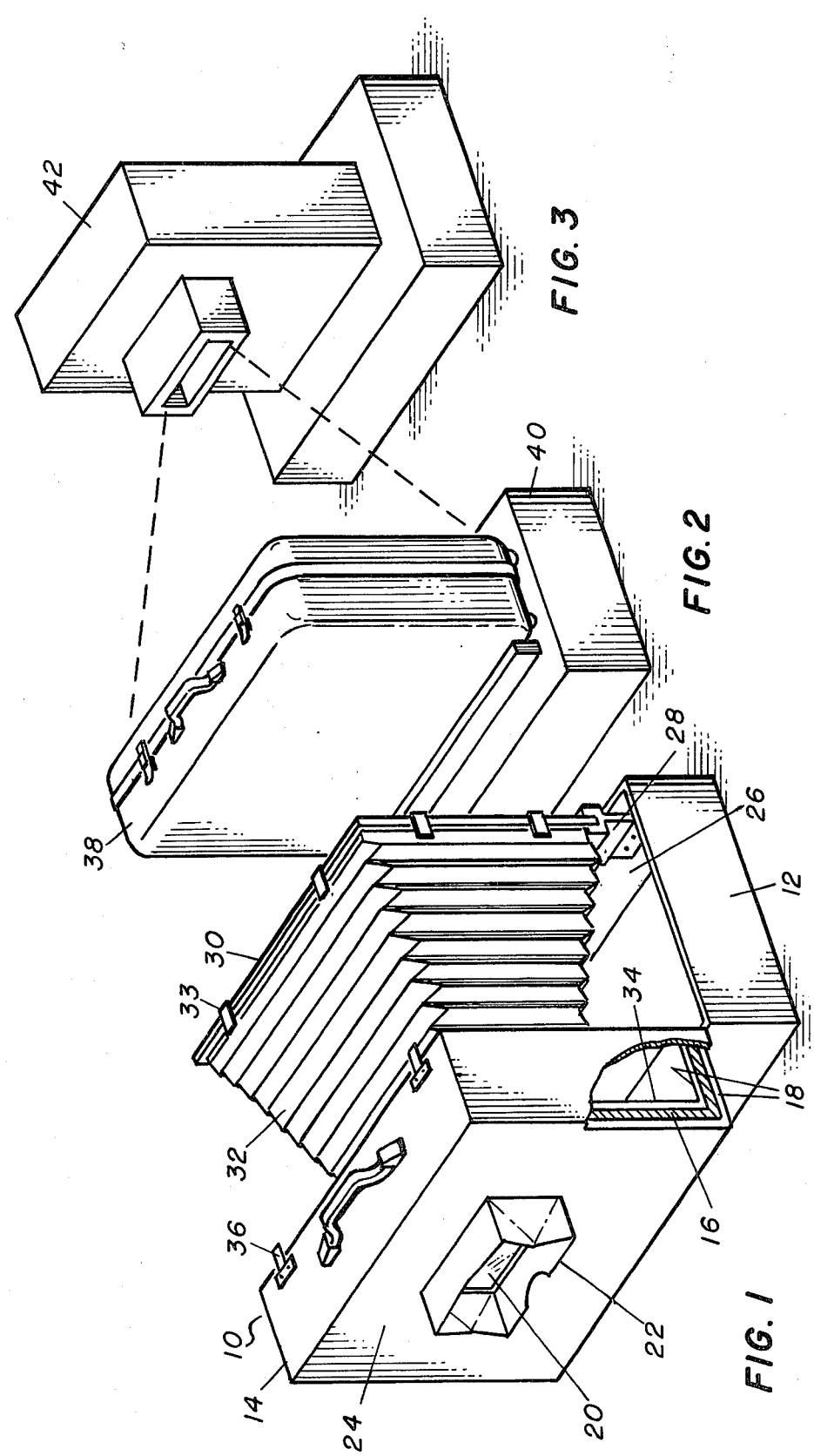

PORTABLE FLUOROSCOPE

GOVERNMENTAL INTEREST

The invention described herein may be manufactured, used and licensed by or for the Government for governmental purposes without the payment to us of any royalty thereon.

BACKGROUND OF THE INVENTION

Various means have been used in the prior art to incorporate a fluoroscope within a suitcase so that it can be readily carried to an inspection site. Prior art devices have used, as part of the radiation shield, a piece of lead-glass as large as the fluorescent screen and generally in close contact with the fluorescent screen. One of the problems with prior art devices constructed in this fashion is that the large lead-glass shield adds considerable weight to the already heavy lead shield case, thus limiting the portability feature. Another problem with prior art devices similar to that described in U.S. Pat. No. 3,448,266 of P. A. Bucky et al., is that not only are they heavy to carry, but they also have limited fluorescent screen sizes because of the necessity for an equivalently sized lead-glass shield. A further problem with prior art devices employing lead-glass shields, which are the same size as the viewing fluorescent screen, is that they are more expensive to build and more fragile because of their larger size for the same degree of radiation protection.

SUMMARY OF THE INVENTION

The present invention relates to a portable fluoroscope which utilizes a relatively small pane of lead-glass shielding as an eyepiece which is set in a larger panel of non-transparent shielding. The observer inspecting the object being fluoroscoped views the image produced on the case hinged light shielded fluorescent screen through the transparent portion of an opaque radiation shield, which forms one cover of a suitcase. The other cover and sides of the suitcase are also lead lined to shield the observing operator. By using a smaller area of transparent lead-glass, the vulnerability to breakage is reduced. In addition, an approximately 15% reduction in cost and approximately a 25% reduction in total weight can be achieved by the use of the present invention design over the prior art designs which utilize lead-glass radiation shields of the same size as the fluorescent screen.

An object of the present invention is to provide a portable fluoroscope which is approximately 25% lighter in weight than prior art portable fluoroscopes having the same screen size and shielding capability.

Another object of the present invention is to provide a portable fluoroscope which is less vulnerable to lead-glass shielding breakage.

Another object of the present invention is to provide a portable fluoroscope which is approximately 15% lower in cost than prior art portable fluoroscopes having the same size sensing screens and shielding capability.

A further object of the present invention is to provide a portable fluoroscope which is less costly to repair in case of breakage of the lead-glass, see-through, shielding window.

For a better understanding of the present invention, together with other and further objects thereof, reference is made to the following descriptions taken in connection with the accompanying drawings.

BRIEF DESCRIPTION OF THE DRAWINGS

FIG. 1 is a partial cross-section and isometric view of the portable fluoroscope.

FIG. 2 is an isometric view of an object to be irradiated and inspected by the portable fluoroscope.

FIG. 3 is an isometric view of an X-ray generator and collimator for irradiating the object shown in FIG. 2.

DESCRIPTION OF THE PREFERRED EMBODIMENTS

Referring now to FIGS. 1–3 a hinged container 10 has a rectangularly shaped bottom cover section 12 and a matching shaped top cover section 14. The walls of said container 10 have lead layers 16 spaced intermediate non-radiation shielding layers 18 which may be made of such materials as wood, cloth, vinyl or plastic. Centrally positioned within the top cover section 14 is a lead-glass viewing port 20, which has a small rectangularly shaped face fitting fold-down type hood 22 surrounding the outer periphery of the shielded viewing port 20 and attached to the outer surface 24 of top cover section 14. Attached inside to the front side 26 of bottom cover 12 is a pair of hinged U shaped channel members 28 which hold a non-shielded fluorescent screen 30 therein. When screen 30 is in its vertical operating position, as shown in FIG. 1, an opaque bellows 32 is affixed to one side of screen 30 by means of fasteners 33 and to the inside surface 34 of top cover section 14 circumambient lead-glass viewing port 20. When the portable fluoroscope is not in operation the bellows 32 is detached from the screen 30 and stored in a collapsed state in top cover section 14; the screen 30 is folded down into a horizontal position so that it fits within the bottom cover section 12 and top cover section 14 is rotated counterclockwise until lock catches 36 engage locks (not shown) positioned on bottom cover section 12.

In operation after the hinged container 10 is opened and assembled as shown in FIG. 1 a closed package 38 to be inspected, such as a suitcase, is placed on a holding and centering fixture 40, shown in FIG. 2, in front of screen 30 and intermediate collimated X-ray generating source 42 of FIG. 3. X-ray generating source 42 is positioned in alignment with the closed package 38 and screen 30 so that a properly focused X-ray image of the contents of package 38 will form on fluorescent screen 30. Source 42 is collimated to protect an observer peering through eyepiece viewing port and positioned behind the radiation shields of bottom and top sections 12 and 14 respectively from being exposed to hazardous radiation. Thus, in the present instance by placing the fluorescent screen 30 in front of the radiation shielding lead layer 16 and lead-glass barrier 20, and using the aforesaid optical arrangement which permits the use of a substantially smaller lead-glass viewing port, a 25% decrease in the overall weight can be accomplished for the same degree of operator protection.

While there has been described and illustrated specific embodiments of the invention, it will be obvious that various changes, modifications and additions can be made herein without departing from the field of the invention which should be limited only by the scope of the appended claims.

Having thus fully described the invention what is claimed as new and desired to be secured by Letters Patent of the United States is:

1. A portable fluoroscope for inspecting the contents of closed packages which comprises:

housing means for carrying said fluoroscope to an inspection site, having a radiation shielding top cover section hingedly attached to a radiation shielding bottom section wherein said housing means includes a suitcase;

sensing means, hingedly positioned on said bottom cover section, for producing an image of the contents of said packages, wherein said sensing means includes a fluorescent screen;

a lead-glass eyepiece centrally positioned in said top cover section for viewing said sensing means; and means for excluding light from said sensing means to enable an observer peering through said eyepiece to clearly discern the contents of said closed packages, as imaged on said sensing means, wherein said means for excluding light includes a bellows removably attached to said fluorescent screen and to said top cover section.

* * * * *